United States Patent
de Vito

(12) 
(10) Patent No.: US 6,396,850 B1
(45) Date of Patent: May 28, 2002

(54) METHOD FOR CASCADING DETACHABLE CONDITIONAL ACCESS MODULES, CIRCUIT FOR INSERTING A PREDETERMINED SEQUENCE AND CIRCUIT FOR DETECTING THE SAID SEQUENCE IN ORDER TO IMPLEMENT THE METHOD

(75) Inventor: Mario de Vito, Geveze (FR)

(73) Assignee: Thomson Licensing S.A., Boulogne-Cedex (FR)

( * ) Notice: Subject to any disclaimer, the term of this patent is extended or adjusted under 35 U.S.C. 154(b) by 0 days.

(21) Appl. No.: 08/718,823

(22) Filed: Sep. 24, 1996

(30) Foreign Application Priority Data

Oct. 31, 1995 (FR) .......................................... 95 12850

(51) Int. Cl.$^7$ ................................................ H04J 3/00
(52) U.S. Cl. ..................... 370/509; 370/529; 348/425.4; 348/423.1
(58) Field of Search .............................. 370/394, 395, 370/498, 503, 508, 509, 512, 522, 529, 455; 348/423.1, 125.2, 125.3, 125.4

(56) References Cited

U.S. PATENT DOCUMENTS

| | | | | |
|---|---|---|---|---|
| 5,418,784 A | * | 5/1995 | Ramakrishnan et al. | 370/445 |
| 5,473,385 A | * | 12/1995 | Leske | 348/845.3 |
| 5,533,021 A | * | 7/1996 | Brandstad et al. | 370/396 |
| 5,561,791 A | * | 10/1996 | Mendelson et al. | 709/233 |
| 5,588,025 A | * | 12/1996 | Strolle et al. | 375/316 |
| 5,619,337 A | * | 4/1997 | Naimpally | 386/83 |
| 5,619,501 A | * | 4/1997 | Tamer et al. | 370/392 |
| 5,652,627 A | * | 7/1997 | Allen | 348/497 |
| 5,724,446 A | * | 3/1998 | Liu et al. | 382/233 |
| 5,745,696 A | * | 4/1998 | Mendelson et al. | 709/233 |
| 5,790,543 A | * | 8/1998 | Cloutier | 370/395 |
| 5,812,554 A | * | 9/1998 | Kadambi et al. | 370/473 |
| 5,870,398 A | * | 2/1999 | Kotchey | 370/455 |

FOREIGN PATENT DOCUMENTS

| | | | | |
|---|---|---|---|---|
| EP | 0562295 | | 9/1993 | H04N/7/167 |
| EP | 0674440 | | 9/1995 | H04N/7/167 |
| GB | 2261580 | | 5/1993 | H04N/7/16 |

OTHER PUBLICATIONS

Cable TV Sessions, Montreux, 6/10–15/93 No. SYMP 18, Jun. 11, 1993 Vigarie, A device for real–time modification of access conditions in a D2–MAC/Packet Eurocrypt signal: The Transcontroller.

Cable TV Session, Montreux, 6/10–15,93 No. SYMP. 18 Jun. 11, 1993 Postes: Telephones et Telegraphes Suisses, pp. 458–462, Boyer, R. "Digital Broadcast Satellite System".

Copy of Search Report.

* cited by examiner

*Primary Examiner*—Douglas Olms
*Assistant Examiner*—Bob A. Phunkulh
(74) *Attorney, Agent, or Firm*—J. S. Tripoli; D. T. Shoneman

(57) ABSTRACT

The present invention concerns a method for cascading detachable conditional access modules as well as a circuit for inserting a predetermined sequence and a circuit for detecting the sequence. Each module receives a data stream formed of packets of fixed length separated by an interpacket space of fixed length. The interpacket spaces contain a constant predetermined sequence which does not interfere with the packets. The predetermined sequence may be used to regenerate a packet clock signal.

6 Claims, 4 Drawing Sheets

METHOD FOR CASCADING DETACHABLE CONDITIONAL ACCESS MODULES, CIRCUIT FOR INSERTING A PREDETERMINED SEQUENCE AND CIRCUIT FOR DETECTING THE SAID SEQUENCE IN ORDER TO IMPLEMENT THE METHOD

FIELD OF THE INVENTION

The present invention concerns a method for cascading detachable conditional access modules. It also concerns a circuit for inserting a predetermined sequence as described in the method and a circuit for detecting such sequence.

BACKGROUND OF THE INVENTION

In the field of digital pay television, the decoders currently on the market include, as depicted schematically in FIG. 1, an input circuit 1 or "front end" consisting amongst other things of a demodulator, a demultiplexer 2 associated with a descrambler 3, a microprocessor 4 connected to the descrambler 3 in order notably to supply the control word CW, and video 5 and audio 6 circuits connected at the output of the demultiplexer. A chip card 7 including notably data authorising access to the programmes is connected in a known manner to the microprocessor 4 of the decoder. The decoder receives at its input a "multiplex" signal which can contain a very large number of programmes, some being in clear, others being scrambled. The video signal is sent over the input circuit 1, which makes it possible to recover at the output a data stream TS or "transport stream" consisting of packets of fixed length separated by an interpacket space of fixed length, each packet being detected by a packet clock PC. The role of the demultiplexer, descrambler, microprocessor and chip card, is notably, to descramble the scrambled packets belonging to the programme selected in respect of which the user has right of access. Currently the service providers desiring to transmit scrambled programmes define the specificities of their own decoder, and in particular those of their access control system. These specific elements or secrets of the conditional access sub-system prevent its standardisation.

In order to remedy these drawbacks and to allow the production of future standard digital television reception systems, it has been proposed to isolate the conditional access sub-system within a detachable module in the chip card format or PCMCIA format. In this case, several detachable modules can be connected to a single decoder. The entire data flow is obtained at the output of the input circuit of the decoder and passes successively through each module connected in cascade. Each module makes it possible to descramble the scrambled packets which concern it. Thus, when the conditional access information used for the selected programme is recognised by the module and when the user has right of access to this programme, then and only in such cases are the corresponding packets of the data flow descrambled whilst keeping their relative positions. A decoder of the above type is depicted schematically in FIG. 2. The decoder includes an input circuit 1' which receives the high-frequency signal S, demodulates it so as to obtain the data stream TS0 or "transport stream" and the packet clock PCL, and then sends it to the input of the first detachable module A. Each detachable module also includes a demultiplexer 2' associated with a descrambler 3' and a microprocessor 4'. It can be in the chip card format or in the format of a PCMCIA module such as the ones existing in the microcomputing world. The data stream TS1, possible partly descrambled by the above circuits, leaves the module offset in time with respect to the stream through a dedicated output, as depicted on the interface 5'. It is then sent to a dedicated input of the second detachable module B, where it undergoes identical processing and so on according to the number of detachable modules which may be connected to the decoder. The data stream TS2 output from the last module is sent to the input of a demultiplexer 6' in the decoder which is connected in a known manner to the audio 8' and video 7' circuits. In addition, the decoder includes a microprocessor 9' connected to each microprocessor 4' situated in each detachable module and to the demultiplexer 6'. As mentioned above, the data stream at the output of a module is offset in time with respect to the data stream at the input, and it is therefore necessary to have a clock enabling the data to be found, as in the case of decoders currently used. Moreover, the data stream is divided into bit packets of fixed length separated from each other by a space of fixed length. In this case, a packet clock PC0 is associated with the data stream in order to indicate the start and end of a packet. This packet clock is in general used at the detachable module. Thus, in Europe, the proposed common interface provides for an incoming packet clock PC0–PC1 and an outgoing packet clock PC1–PC2, which requires two dedicated interface pins, as depicted in FIG. 2, which corresponds to the DVB proposals in the course of standardisation. In the USA, the proposed detachable module provides for a packet clock at the input of the module, but no packet clock at the output. Though this proposal makes it possible to save on an interface pin, it has the drawback that the detachable module must be able to provide, at the decoder and possibly at the other modules, information about the delay given to the packets of the data stream passing through it so that the decoder and the detachable modules are able to reconstruct the packet clock of the re-entering data stream through a correct offset of the reference packet clock.

The aim of the present invention is to remedy the above drawbacks by proposing a method which makes it possible not to use dedicated pins at the module/decoder interface, in order to obtain the packet clock in each module and in the decoder.

SUMMARY OF THE INVENTION

The object of the present invention is a method for cascading detachable conditional access modules without having recourse to a packet clock signal, each module having pass through it a data stream formed by packets of fixed length separated by a space of fixed length, characterised in that the interpacket space is filled with a predetermined sequence which does not interfere with the useful content of the packets, this sequence being used to regenerate a packet clock.

According to a preferential embodiment, the predetermined sequence consists of an increasing or decreasing series of binary data. Preferably the predetermined sequence is continued by a data item of determined and identical value located at the start of all the packets.

Another object of the present invention is a circuit for inserting the predetermined sequence located at the output of the input circuit of the decoder. The circuit includes a multiplex receiving the original data stream at a first input and, at a second input, the data in the predetermined sequence coming from a means generating the predetermined sequence, a start of packet and end of packet detector enabling either the first input or the second input to be selected.

Yet another object of the present invention is a circuit for detecting the predetermined sequence located at the modules and decoder. This circuit includes:

a comparator receiving at a first input the data stream incorporating the predetermined sequence between each packet and at a second input the data of the predetermined sequence;

a means for generating the data of the predetermined sequence, this means being addressed by the output of the comparator so as to send the first data item of the predetermined sequence when the comparator detects inequality and to send the following data item of the predetermined sequence when the comparator detects equality, and a means generating a pulse corresponding to the length of a packet, this said means being activated by the detection of the last data item of the predetermined sequence.

BRIEF DESCRIPTION OF DRAWINGS

Other characteristics and advantages of the present invention will emerge from a reading of the description of a preferential embodiment, this description being given with reference to the accompanying drawings, in which.

DETAILED DESCRIPTION OF THE INVENTION

In order to simplify the description, in the figures, the same references designate the same components.

In accordance with the present invention, in order to avoid using at least one pin dedicated to the packet clock PC0 at the interface between decoder and detachable module, use is made of the fact that, in the systems currently defined in the USA and in Europe, the data stream TS is divided into packets of fixed length, the packets being separated by an interpacket space which is also of fixed length. Thus the invention consists of filling this interpacket space of fixed length with a predetermined sequence. This sequence is constant and does not interfere with the useful content of the packets. It is used to regenerate the packet clock. The predetermined sequence preferably consists of an increasing or decreasing series of binary data. It can be continued by a data item of determined and identical value located in all the packets, at the start of these packets.

By way of example, in the case of the European DVB standard in the course of discussion, based on the MPEG2-system standard, the data stream is divided into packets of 1504 bits (188 octets) separated from each other by a space of 128 bits (16 octets). If these 16 octets are filled with the continuous sequence ranging from 0 to 15, a start of packet is then identified by the succession of 16 octets successively taking an increasing value in the range 0 to 15. The probability of detecting a false synchronisation is then equal to $5.10^{+37}$. This probability is calculated on the assumption that the sequence cannot be partially merged with a series of the same length of the data stream. Moreover, the data stream defined by the MPEG2 system standard has a constant octet at the start of the packet used for synchronisation. According to another characteristic of the invention, this octet can be included at the end of the predetermined sequence in order to reduce still further the probability of false detection. The use of a predetermined sequence consisting of an increasing series of octets has been described. It is obvious to persons skilled in the art that any strictly monotonic increasing or decreasing sequence can be used.

Figure 1:
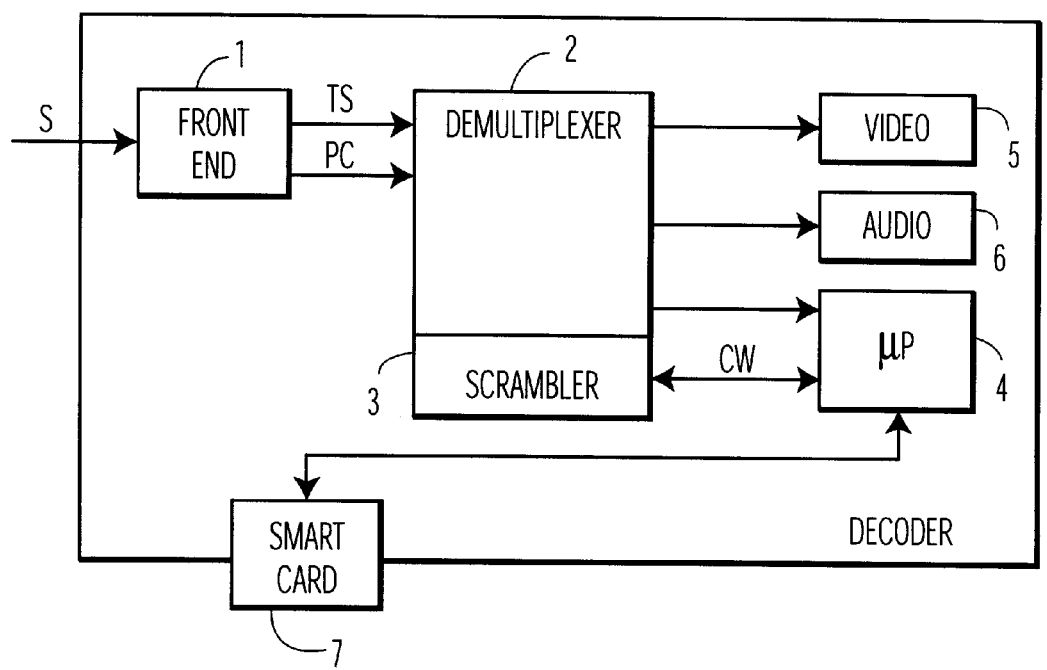
FIG. 1, already described, is a diagram in block form of a decoder according to the prior art.
Figure 2:
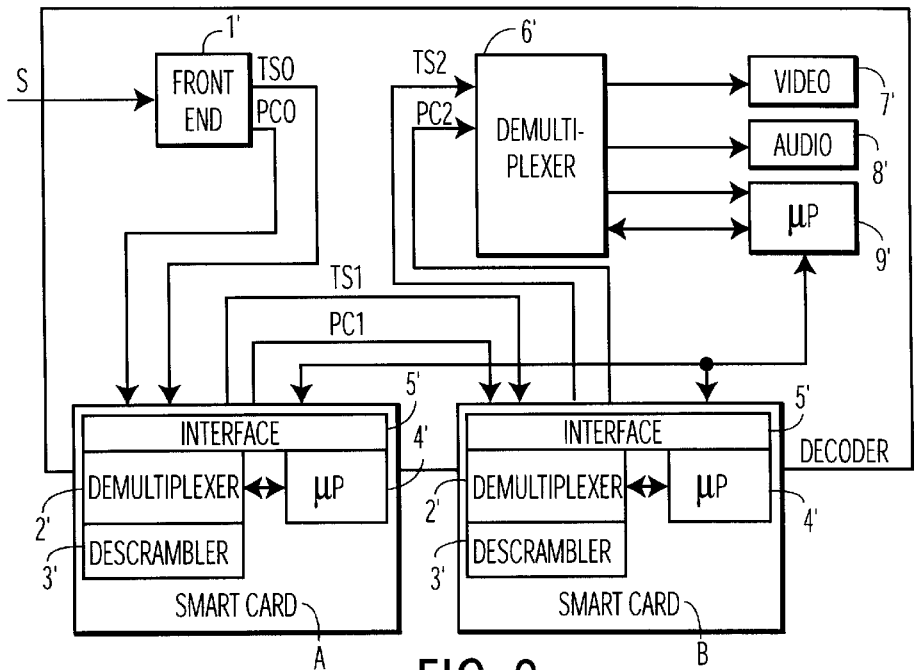
FIG. 2, already described, is a diagram in block form of a decoder provided with detachable modules, according to the prior art.
Figure 3:
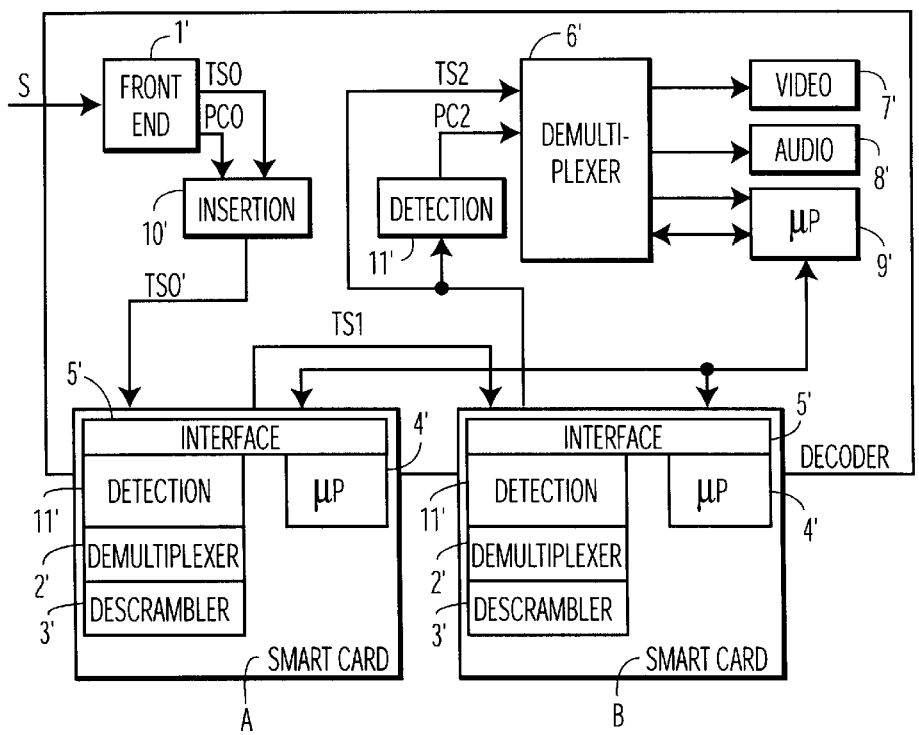
FIG. 3 is a diagram in block form of a decoder provided with detachable modules according to the present invention.

A description will now be given of the modifications made to the decoder in FIG. 2 in order to implement the above method. In this case, the high-frequency signal S at the input of the decoder is sent over an input circuit 1' identical to that in FIG. 2. At the output of this input circuit 1', the data stream TS0 and the packet clock PC0 are obtained in a known manner. In accordance with the invention, the data stream TS0 and the packet clock PC0 are sent over a circuit 10 for inserting a predetermined sequence which will be described below in more detail. There is obtained at the output a data stream TS0' including the predetermined sequence between each packet. This data stream TS0' is sent via a dedicated pin of the interface 5' into the first detachable module A. In this first module A, it is processed by the detection circuit 11' for the predetermined sequence so as to obtain the packet clock required for performing the operations effected by the demultiplexer 2', the descrambler 3' and the microprocessor 4', which have the same functions as in the embodiment in FIG. 2. These functions do not form part of the present invention and will therefore not be described in any more detail. Once processed, the new data stream TS1 is sent via a dedicated output of the interface at the input of the second detachable module B identical to the first detachable module A with regard to its structure. It therefore includes an interface 5', a detection circuit 11' for the predetermined sequence, a demultiplexer 2', a descrambler 3' and a microprocessor 4'. The data stream TS1 undergoes, in the module B, a processing similar to that undergone in the module A. The new data stream TS2 is then sent into the decoder in the embodiment depicted with two detachable modules. The data stream TS2 is then sent to the input of the demultiplexer 6' and to the input of a detection circuit 11' for the predetermined sequence identical to that of the detachable modules so as to retrieve the packet clock PC2 which is sent over the demultiplexer 6'. The other circuits, namely the video circuit 7', the audio circuit 8' and the microprocessor 9' are identical to the circuits of the decoder in FIG. 2 and function in the same way.

Figure 4:
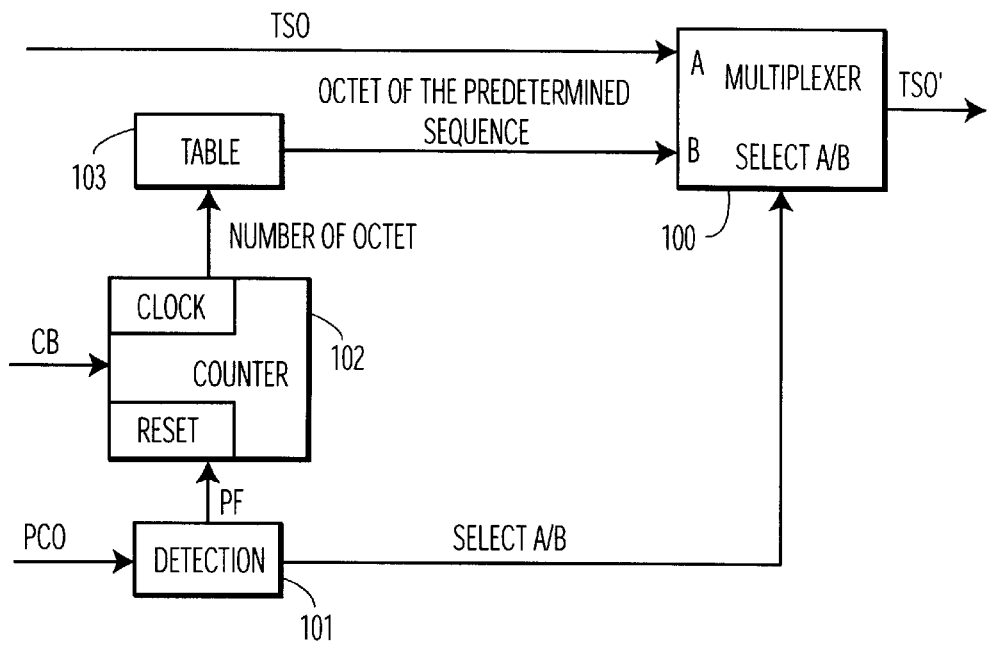
FIG. 4 is a diagram of an insertion circuit according to the present invention.
Figure 5:
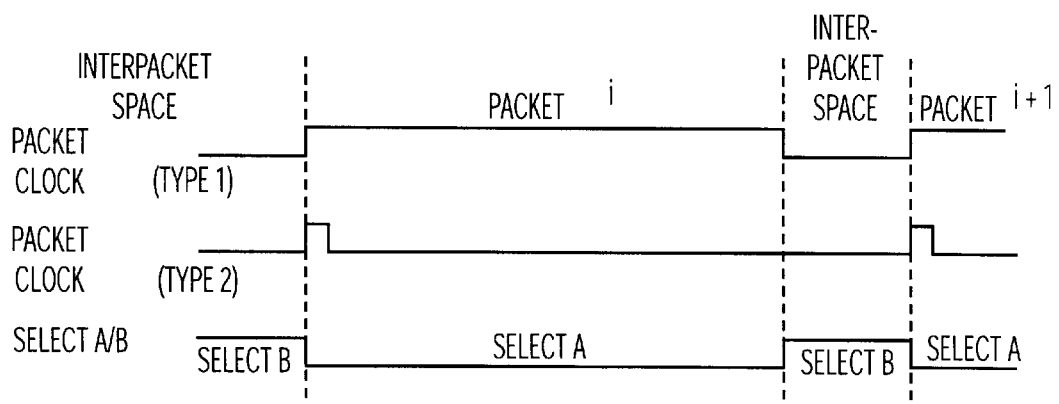
FIG. 5 is a timing diagram explaining the operation of the insertion circuit.
Figure 6:
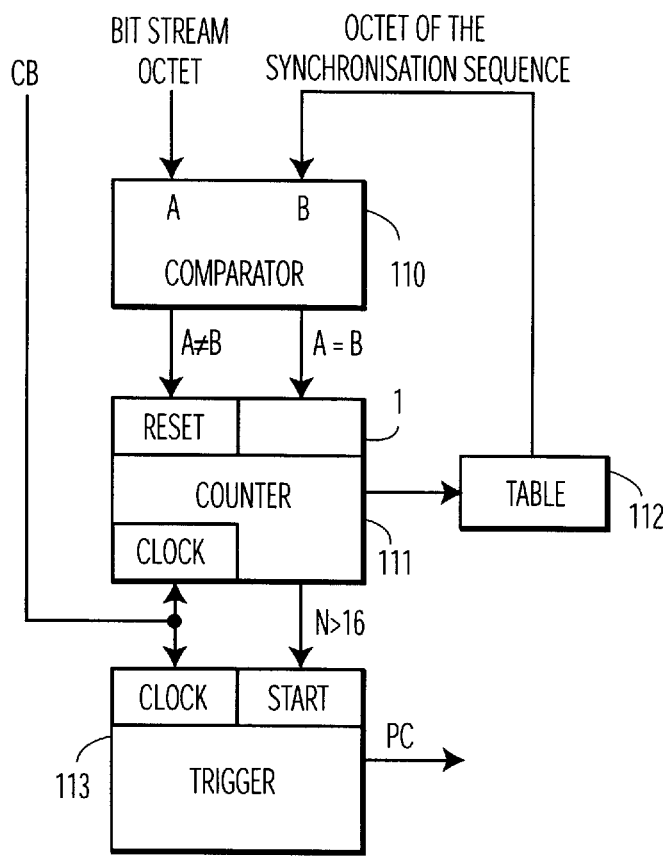
FIG. 6 is a diagram of a detection circuit according to the present invention.

A description will now be given, with reference to FIGS. 4 and 5, of an embodiment of the circuit 10' for inserting the predetermined sequence. As depicted in FIG. 4, the circuit includes a multiplexer 100 which receives at an input A the octets of the original data stream TS0. At its other input B it receives the octets of the predetermined sequence. Passage from the input A to the input B and vice-versa is determined by a selection pulse Select A/B which is obtained from a packet boundary detection circuit 101 which receives as its input the packet clock PC0. The octet of the predetermined sequence can be obtained in different ways. Thus, in the embodiment depicted in FIG. 4, the circuit includes a counter 102 counting from 1 to 16 at the rate of the clock CB or octet clock. The counter includes a reset to 1 input RESET which is activated by an end of packet pulse PF coming from the packet start and end detection circuit 101. With each clock pulse, the counter 102 sends a data item which corresponds to the number of the octet in the sequence to a table 103 which contains the different values of the packets, the pulse Select A/B is at logic 0 and the input A of the multiplexer 100 is selected so as to allow the octets of the original data stream TS0 to pass. In this way a data stream TS0' is obtained at the output of the multiplexer, with insertion of a predetermined sequence. A description will now be given, with reference to FIGS. 6 and 7, of an embodiment of a circuit 11' for detecting the predetermined sequence. The circuit therefore includes a comparator 110 which receives at its input A the octets of the data stream provided with the predetermined sequence such as TS0, TS1, TS2 and, at its input B, the octets of the predetermined sequence coming from a circuit defining the predetermined sequence. In the embodiment in FIG. 6, this circuit consists of a counter 111 which counts at the octet clock frequency. This is because the octet clock CB is applied to the "clock" input of the counter 111. Moreover, the counter receives at its input 1 the output of the comparator when A=B and at its Reset input the output of the comparator when A≠B. In the embodiment depicted, the counter counts between 1 and 16. The output of the counter is sent as an address to a table 112 which contains the value of the octets of the predetermined sequence. The octet of the predetermined sequence corresponding to the octet number coming from the counter is sent to the input B of the comparator 110. When the counter exceeds the value 16, it sends a pulse N>16 to the "start" input of a pulse generator 113, which in fact consists of a monostable multivibrator with a length of 188 octets, this generator giving at its output the packet clock PC.

Figure 7:
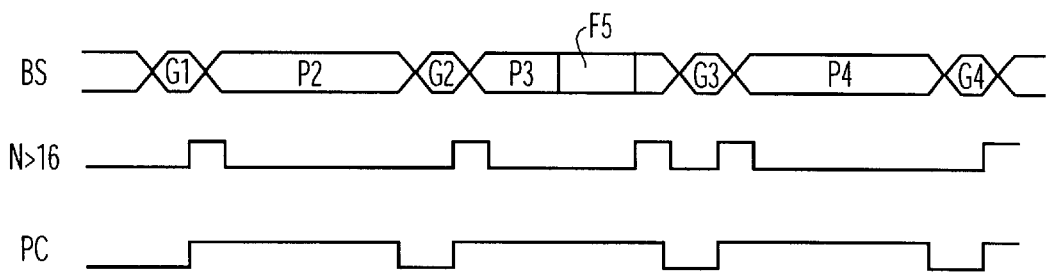
FIG. 7 is a timing diagram explaining the operation of the detection circuit.

The operation of the circuit will be understood better by means of the timing diagram in FIG. 7. In this figure, BS corresponds to the data stream TS0', TS1, TS2 provided with the predetermined sequence. When the system is started up, the counter is set to 1. The current octet coming from the data stream is compared with the octet of the predetermined sequence whose ranking is given by the counter. If A≠B, the counter is reset to 1, if A=B the counter is incremented. When the counter reaches the value 17, it sends a pulse represented by N>16 in FIG. 7, which triggers the monostable multivibrator 113 as represented by PC in FIG. 7. However, as the monostable multivibrator cannot be reset to zero and its pulse has a duration corresponding to one packet, that is to say 188 octet clock cycles CB in the embodiment depicted, no other detection of a predetermined sequence can retrigger the generator 113. Thus, as depicted in FIG. 7, the false sequence FS triggers a pulse N>16, but this pulse does not affect the packet clock PC.

It is obvious to persons skilled in that art that the circuits generating the predetermined sequence can be modified, as mentioned for the circuit for inserting the said sequence. The value output from the counter can be used as the value of the octet of the predetermined sequence or another means of addressing the table which can be produced by any type of memory.

Moreover, the method of the present invention can also be applied to any module with a function of processing a multiplex formed by packets of fixed length separated by a space of fixed length.

What is claimed is:

1. A circuit comprising:

(a) a comparator having a first input for receiving a data stream and a second input for receiving data corresponding to a predetermined sequence, said data stream comprising packets of fixed length separated by an interpacket space of fixed length, said interpacket space comprising said predetermined sequence;

(b) a data generator for generating said data corresponding to said predetermined sequence, said data generator comprising a memory for storing a table containing, at successive addresses, said data of said predetermined sequence, an address input of said memory being set to a first address each time said comparator detects inequality and said address input of said memory is incremented or decremented each time the comparator detects equality, said table being associated with means for sending a first pulse (N>16) when all the data corresponding to said predetermined sequence has been sent; and (c) a pulse generator for generating a second pulse indicating the length of said packet, said pulse generating means being enabled in response to detection of said first pulse indicating that all the data corresponding to said predetermined sequence has been sent.

2. A circuit according to claim 1 wherein said address input of said memory is given by a counter (111) reset to 1 at the initial address each time the comparator detects inequality, and incremented or decremented each thime the comparator detects equality, the output of the comparator addressing said memory and the counter being incremented or decremented in a range of limited values and sending a pulse at the end of the range (N>16).

3. Circuit according to claim 2, characterised in that the means for generating the data of the predetermined sequence consist of a counter whose output directly gives the values of the octet of the predetermined sequence.

4. Circuit according to claim 1, characterised in that the means (113) for generating a pulse corresponding to the length of a packet consists of a monostable multivibrator which cannot be reset to zero.

5. A circuit for inserting a constant predetermined sequence in a data stream having packets which are separated by interpacket spaces, the circuit comprising:

(a) means for generating said constant predetermined sequence, said predetermined sequence comprising different data concatenated together, said means including a counter reset to the initial value of the predetermined sequence at each end of packet and incremented by a predetermined amount at each octet clock cycle;

(b) a multiplexer having a first input for receiving said data stream and a second input connected to said generating means for receiving said data corresponding to said predetermined sequence; and (c) a detection circuit for detecting a start and an end of a packet in said data stream and for sending data selecting one of said first and second inputs.

6. The circuit according to claim 5, wherein said counter is incremented by 1 at each octet clock cycle.

* * * * *